United States Patent
Shimoda et al.

(10) Patent No.: US 9,912,789 B2
(45) Date of Patent: Mar. 6, 2018

(54) ELECTRONIC DEVICE

(71) Applicant: KYOCERA CORPORATION, Kyoto (JP)

(72) Inventors: Tetsuya Shimoda, Kirishima (JP); Hayato Mizuno, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/222,409

(22) Filed: Jul. 28, 2016

(65) Prior Publication Data

US 2016/0337489 A1 Nov. 17, 2016

Related U.S. Application Data

(63) Continuation of application No. PCT/JP2015/052470, filed on Jan. 29, 2015.

(30) Foreign Application Priority Data

Jan. 29, 2014 (JP) .................. 2014-014276

(51) Int. Cl.
*H04M 1/02* (2006.01)
*G06F 1/16* (2006.01)

(52) U.S. Cl.
CPC ............ *H04M 1/0266* (2013.01); *G06F 1/16* (2013.01); *G06F 1/1626* (2013.01)

(58) Field of Classification Search
CPC ....... H04M 1/0266; G06F 1/16; G06F 1/1626
USPC .................... 455/566, 575.1, 575.8
See application file for complete search history.

(56) References Cited

U.S. PATENT DOCUMENTS 8,467,172 B2 * 6/2013 Sugimori ................ H04M 1/22
                                                    361/679.01

FOREIGN PATENT DOCUMENTS

JP          2007-304390 A      11/2007

* cited by examiner

*Primary Examiner* — Ping Hsieh
(74) *Attorney, Agent, or Firm* — Duane Morris LLP

(57) ABSTRACT

An electronic device according to an embodiment of the present disclosure includes a translucent panel and a casing to which the translucent panel is attached. The translucent panel includes a curved portion curved toward the casing. The casing includes an attaching surface facing an end surface of the translucent panel, the end surface facing the casing. A distance between an end of the end surface of the translucent panel and a portion of the attaching surface of the casing facing the end of the end surface is longer than a distance between a middle portion of the end surface of the translucent panel and a portion of the attaching surface of the casing facing the middle portion.

5 Claims, 6 Drawing Sheets

ELECTRONIC DEVICE

CROSS-REFERENCE TO RELATED APPLICATION

The present application is a continuation based on PCT Application No. PCT/JP2015/052470 filed on Jan. 29, 2015, which claims the benefit of Japanese Application No. 2014-014276, filed on Jan. 29, 2014. PCT Application No. PCT/JP2015/052470 and Japanese Application No. 2014-014276 are each entitled "Electronic Device," and their contents are each incorporated by reference herein in their entirety.

FIELD

The present disclosure relates to an electronic device including a translucent panel including a curved portion at an edge.

BACKGROUND

An electronic device, such as a mobile phone or a smartphone, has a translucent panel made of glass or the like attached to an opening located in a casing in order to protect a touch panel and a display located within the casing.

SUMMARY

An electronic device according to an embodiment of the present disclosure includes a translucent panel including a curved portion curved toward a specific direction an end surface toward the specific direction, and a casing including an attaching surface facing the end surface. The translucent panel is attached to the casing. A distance between an end of the end surface and a portion of the attaching surface facing the end of the end surface is longer than a distance between a middle portion of the end surface and a portion of the attaching surface facing the middle portion.

The foregoing and other objects, features, aspects and advantages of the present disclosure will become more apparent from the following detailed description of the present disclosure when taken in conjunction with the accompanying drawings.

DETAILED DESCRIPTION

In a background electronic device, it may be desired to stably attach a translucent panel including a curved portion to a casing.

Hereinafter, an embodiment of the present disclosure will be described with reference to the drawings.

Examples of an electronic device 10 to which the present disclosure is applicable can include a mobile phone, such as a smartphone, a tablet computer, a PDA (Personal Digital Assistant), a portable music player, a notebook personal computer, a game machine, and the like. These are not limitations, but any electronic device can be adopted as along as, for example, information can be displayed on a screen thereof and a touch operation can be performed on the screen. Hereinafter, an embodiment in which the present disclosure is applied to a smartphone will be described.

Figure 1:
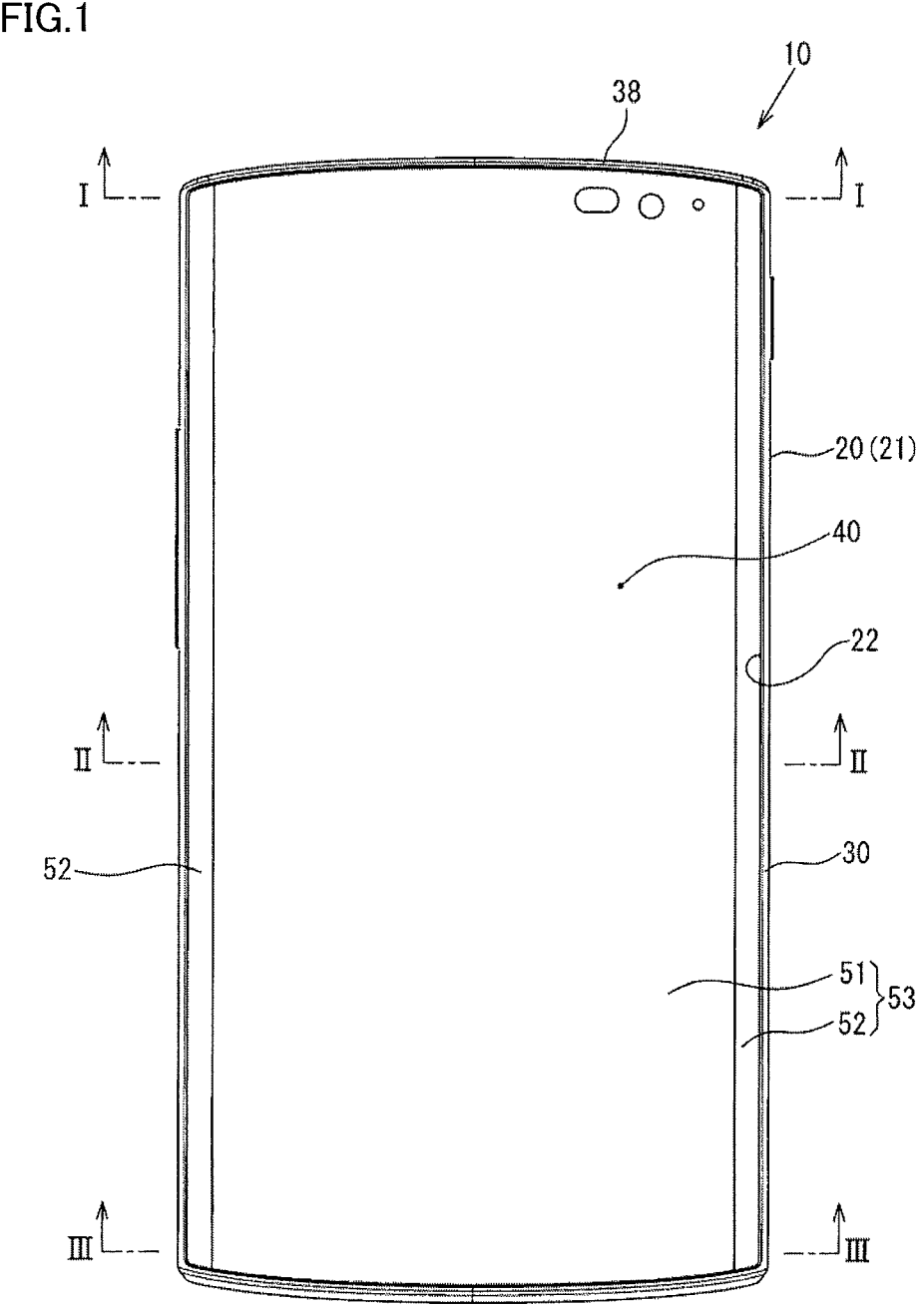
FIG. 1 is a plan view of an electronic device.
Figure 2:
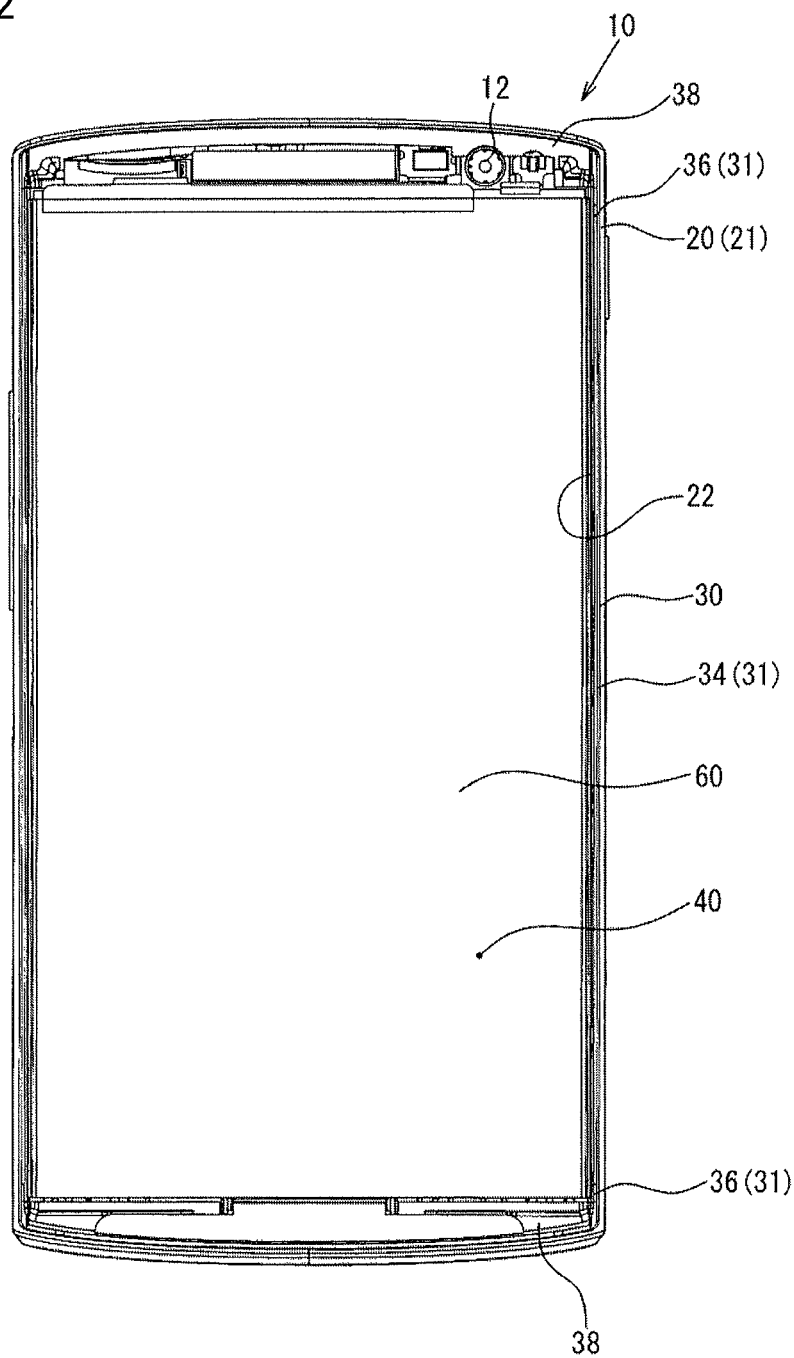
FIG. 2 is a plan view of the electronic device with a translucent panel removed.

FIG. 1 is a front view showing an embodiment of electronic device 10. As shown in the drawing, electronic device 10 is configured such that substantially the whole surface of a casing 20 may be covered with a front unit 40. Front unit 40 visually recognized in FIG. 1 may include a translucent panel 50. FIG. 2 shows a state where translucent panel 50 has been removed from front unit 40 for ease of description.

Figure 3:
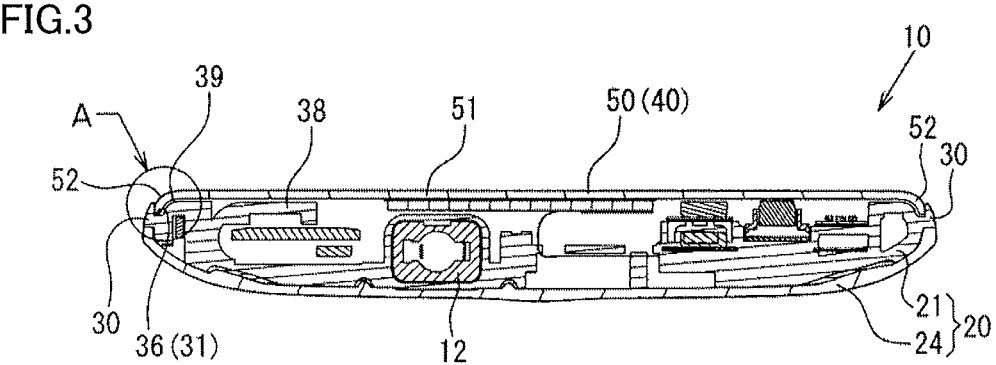
FIG. 3 is a cross sectional view taken along the line I-I shown in FIG. 1.
Figure 4:
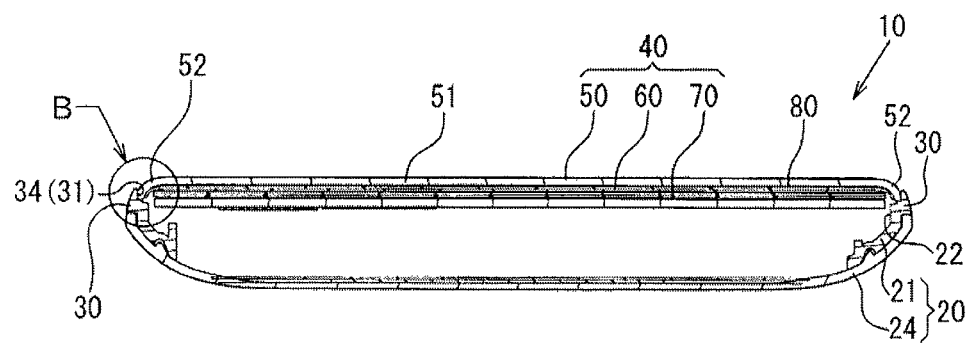
FIG. 4 is a cross sectional view taken along the line II-II shown in FIG. 1.
Figure 5:
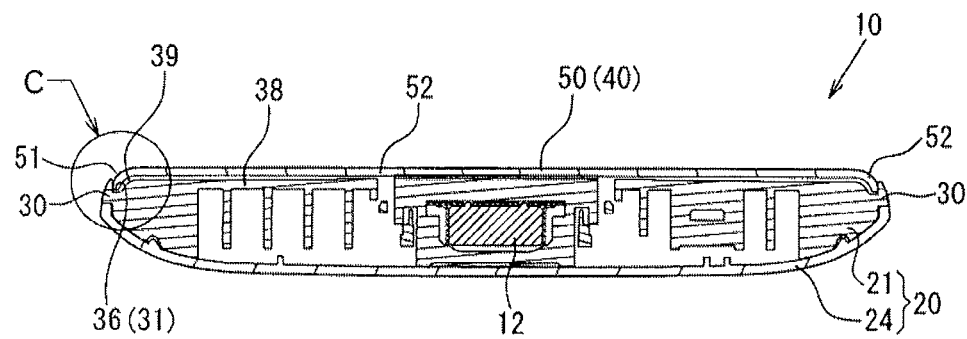
FIG. 5 is a cross sectional view taken along the line shown in FIG. 1.
Figure 6:
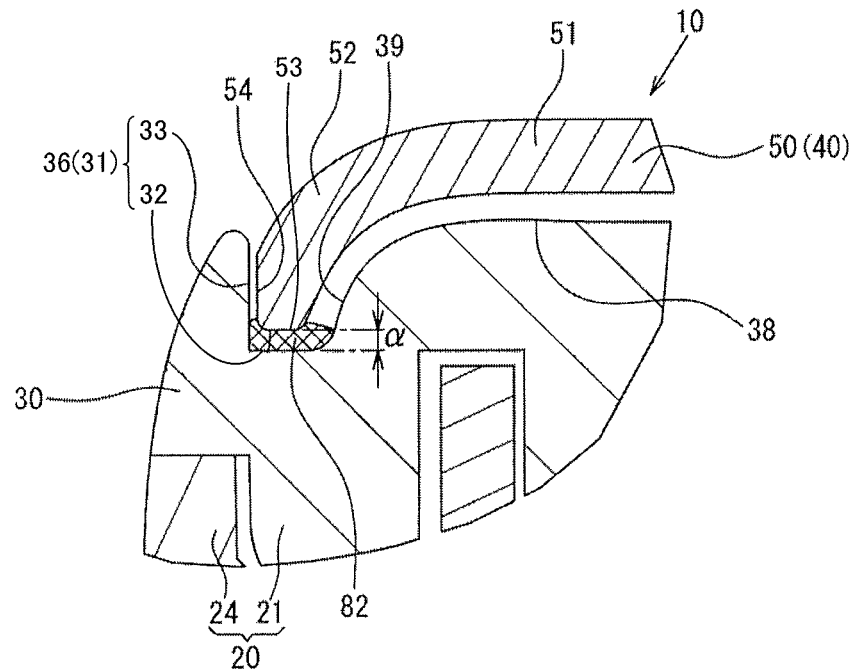
FIG. 6 is an enlarged cross sectional view of a circled part A shown in FIG. 3.
Figure 7:
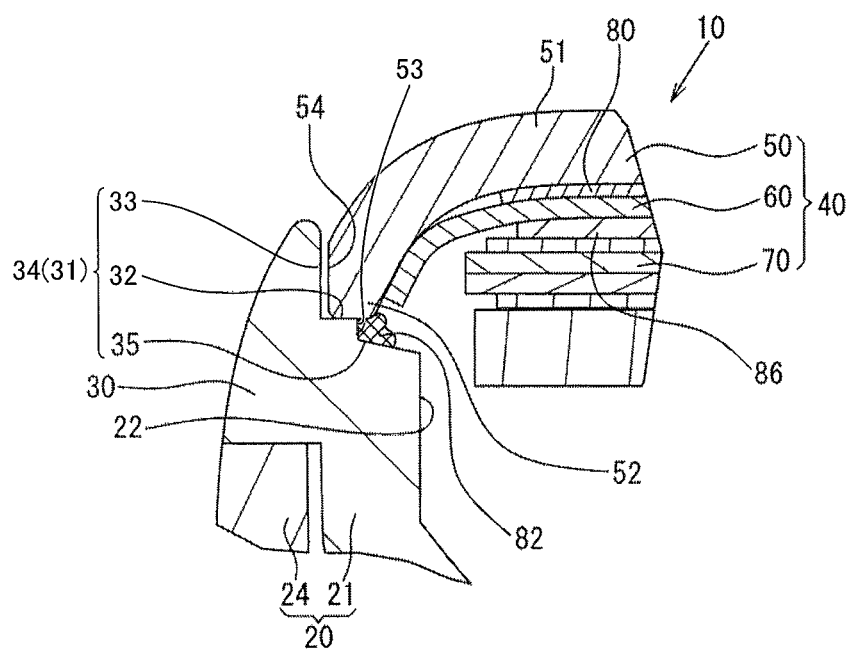
FIG. 7 is an enlarged cross sectional view of a circled part B shown in FIG. 4.
Figure 8:
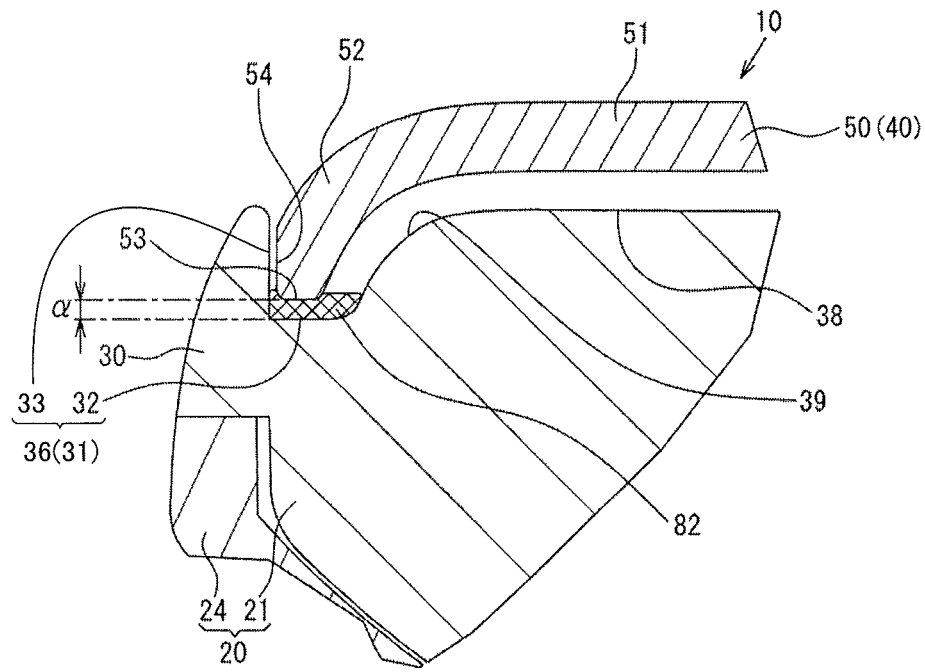
FIG. 8 is an enlarged cross sectional view of a circled part C shown in FIG. 5.

As shown in FIGS. 3 to 5 and their enlarged views FIGS. 6 to 8, front unit 40 may include translucent panel 50 exposed to the outside, a touch panel 60 located at the rear side thereof, and a display 70.

Translucent panel 50 is a light transmitting panel, and can be formed from glass or resin. Translucent panel 50 serves as a member for protecting touch panel 60 and display 70 which will be described later. When a user touches translucent panel 50, an operation may be performed on touch panel 60. Display 70 can be visually recognized through translucent panel 50 and touch panel 60. Translucent panel 50 may be made of any single crystal material, such as a sapphire panel, that can include a curved portion 52 as will be described later. The sapphire panel refers to a panel made of a single crystal material containing alumina ($Al_2O_3$) as a main component. The "main component" specifically refers to a component occupying more than or equal to 50 mass %, preferably more than or equal to 70 mass %. As the material of translucent panel 50, a single crystal having an $Al_2O_3$ purity of more than or equal to approximately 90% is desirable in terms of less susceptibility to scratches and more reliable suppression of cracks, chips and the like. Besides a sapphire panel, examples of a single crystal material to be employed for translucent panel 50 can include diamond, zirconia, titania, crystal, lithium tantalate, aluminum oxynitride, and the like. As for these materials, a single crystal having a purity of more than or equal to approximately 90% is also preferable in terms of less susceptibility to scratches and more reliable suppression of cracks, chips and the like.

In an embodiment, translucent panel 50 may include a so-called curved panel including curved portion 52 in which the edge side is bent downward from a substantially rectangular flat surface 51 at the central side. Curved portion 52 can be formed by bending a planar glass or a resin thin plate. In the illustrated embodiment, curved portion 52 may be formed to present substantially a quarter circle extending from flat surface 51 and having a substantially constant curvature. In an embodiment, curved portion 52 may be located in proximity to each of the opposed two ends in the longitudinal direction of substantially rectangular translucent panel 50, but can also be located in proximity to each of the ends in the direction orthogonal to the longitudinal direction, or can also be located in proximity to only one end. Although the panel having flat surface 51 in proximity to the center is described as an example of translucent panel 50, this is not a limitation in the present disclosure, but the panel may have a curved surface in proximity to the center.

As shown in FIGS. 6 to 8, more specifically, curved portion 52 is bent arcuately downward from flat surface 51, and a lower edge 53 thereof may be cut or polished so as to be substantially parallel to flat surface 51. The both side edges of translucent panel 50 are formed by partly cutting or polishing curved portion 52 to present an edge portion 54 substantially orthogonal to flat surface 51.

Touch panel 60 covering flat surface 51 and curved portion 52 of translucent panel 50 may be located on the rear surface of translucent panel 50. For example, a flexible touch panel can be employed, and can be implemented by arranging electrodes and wires on a transparent flexible substrate. As touch panel 60, a capacitance type or resistive film type panel can be illustrated.

Touch panel 60 may be formed to have a width substantially equal to the length of translucent panel 50 on the rear surface, namely, the length of flat surface 51 and its two curved portions 52 on the rear surface, and to have a length slightly shorter than the length of translucent panel 50. Touch panel 60 may include such a size that it overlaps translucent panel 50 in the width direction but translucent panel 50 protrudes from touch panel 60 in the longitudinal direction.

As shown in FIGS. 4 and 7, touch panel 60 of the above-described configuration may be affixed to translucent panel 50 with an adhesive sheet 80 serving as an adhesive joint. A transparent sheet with an adhesive applied to the both sides thereof, such as an optical clear adhesive (OCA), can be employed as adhesive sheet 80. Besides an adhesive sheet, the adhesive joint may be an adhesive itself.

Adhesive sheet 80 can be substantially rectangular and may be configured to have a width substantially equal to the width of flat surface 51 of translucent panel 50 and to have a length substantially equal to the length of touch panel 60.

By affixing adhesive sheet 80 to flat surface 51 of translucent panel 50 and affixing touch panel 60 to adhesive sheet 80 so as to protrude in the width direction, touch panel 60 can be bonded to translucent panel 50.

Since adhesive sheet 80 is not located at curved portion 52 of translucent panel 50 on this occasion, portions on the both sides of touch panel 60 protruding from adhesive sheet 80 do not fully follow curved portion 52 because of its flexibility, but may be gently curved so that the ends abut on curved portion 52, as shown in FIG. 7. Touch panel 60 may be configured to be closer to translucent panel 50 at the curved portion 52 side than at flat surface 51. In touch panel 60, the radius of curvature of a surface facing curved portion 52 of translucent panel 50 can be made larger than the rear-side radius of curvature of curved portion 52 of translucent panel 50 by the thickness of adhesive sheet 80, which can reduce the occurrence of disconnection due to bending of touch panel 60 at a small radius of curvature.

Adhesive sheet 80 only needs to be located on flat surface 51 of translucent panel 50, which brings another advantage in that the operation of affixing adhesive sheet 80 can be simplified as compared with the case of affixing adhesive sheet 80 even to curved portions 52.

Translucent panel 50 and touch panel 60 may be bonded together by previously affixing adhesive sheet 80 to touch panel 60 and then to translucent panel 50. In this case, the above-described configuration and effects can also be obtained as a matter of course.

As described above, touch panel 60 is located on the rear surfaces of flat surface 51 and curved portions 52 of translucent panel 50. A user can operate electronic device 10 by touching not only flat surface 51 of translucent panel 50 but also curved portions 52, which can increase the operability and operational variations of electronic device 10 as much as possible.

Display 70 may be located on the rear surface of touch panel 60, as shown in FIGS. 4 and 7. A liquid crystal display panel can be employed as display 70, and may be located such that a display surface thereof faces touch panel 60.

A super view resin (SVR) 86 can be interposed between display 70 and touch panel 60, as shown in FIG. 7. By placing the super view resin between display 70 and touch panel 60, an air gap therebetween can be eliminated to increase the visibility and contrast of display 70.

Front unit 40 including translucent panel 50, touch panel 60 and display 70 described above may be attached to casing 20 to form electronic device 10.

Casing 20 has front unit 40 attached to its front side as shown in FIGS. 1 and 2, and a control board for exerting control and the like of electronic device 10, a battery, a memory card, a SIM (Subscriber Identity Module) card, and other electronic components 12 necessary for making communications, phone calls and the like may be stored in casing 20.

For example, casing 20 can be configured to include an inner chassis 21 with an opening 22 located therein and a back chassis 24 covering the rear surface of inner chassis 21, but the present disclosure is not limited to this. Back chassis 24 may be attachable to/detachable from inner chassis 21, so that a battery, a memory card, a SIM card, or the like can be mounted and replaced, for example.

In an embodiment, front unit 40 may be attached to inner chassis 21. More specifically, front unit 40 may be attached to inner chassis 21 with display 70 fitted into opening 22 located in inner chassis 21 and the tip of curved portion 52 of translucent panel 50 fitted into a recess 31 serving as an attaching surface located in inner chassis 21. The attaching surface is not limited to recess 31, but may have a flat or projecting shape.

Inner chassis 21 can be a frame-like chassis having located therein substantially rectangular opening 22 within which display 70 is to be fitted. In inner chassis 21, recess 31 is located, and opening 22 within which display 70 is to be fitted may be formed by a narrow frame part 30 extending in the longitudinal direction and a connection part 38 which links the ends of frame part 30.

As will be described later, an adhesive 82 like a thermosetting resin, such as an epoxy resin, may be applied to recess 31, and a double-faced tape is affixed to connection part 38 for attaching translucent panel 50.

More specifically, recess 31 may be located in the longitudinal direction of frame part 30 as shown in FIGS. 2, 4 and 7. Recess 31 may be located to be adjacent to opening 22. In the illustrated embodiment, recess 31 has a bottom surface 32 extending in the longitudinal direction and an outer wall 33 on the peripheral side of frame part 30. Outer wall 33 may be located upright substantially perpendicularly to bottom surface 32, and edge portion 54 of translucent panel 50 may abut on outer wall 33.

A recess end 36 which is an end of recess 31 serving as the attaching surface may be located at connection part 38 as shown in FIGS. 2, 3, 5, 6, and 8. Hereinafter, in recess 31, a portion between recess ends 36, namely, a portion located in frame part 30 of recess 31 will be called a middle portion 34.

As understood from the comparison among FIGS. 6 to 8, bottom surface 32 of recess end 36 of recess 31 may be deeper than bottom surface 32 of middle portion 34. When attaching translucent panel 50 in which lower edge 53 of curved portion 52 is straight, bottom surface 32 of middle portion 34 shown in FIG. 7 abuts on lower edge 53 of curved portion 52, and at recess end 36 shown in FIGS. 6 and 8, the distance between lower edge 53 of curved portion 52 and bottom surface 32 of recess 31 may be increased to ensure a clearance α.

Bottom surface 32 of middle portion 34 may be adjacent to a stepped portion 35 recessed downward toward the inner side of inner chassis 21 as shown in FIG. 7. With this configuration, bottom surface 32 does not fully abut on lower edge 53 of curved portion 52 of translucent panel 50 in the width direction, but lower edge 53 of curved portion 52 may be unsupported on its inner side.

At recess end 36, the end surface of connection part 38 may serve as an inner sidewall 39 of inner chassis 21. Sidewall 39 is not formed upright substantially perpendicularly to the bottom of recess 31, but can be inclined to be higher toward the inner side as shown in FIGS. 6 and 8.

Various electronic components 12 are mounted on connection part 38 as shown in FIG. 2, and the both ends of connection part 38 may each serve as sidewall 39 raised from bottom surface 32 of recess end 36 described above. A double-faced tape not shown can be affixed to connection part 38 at one or several places for bonding a portion of translucent panel 50 protruding from touch panel 60.

The attachment of front unit 40 to inner chassis 21 of the above-described configuration can be performed in the following manner.

First, adhesive 82 can be applied to recessed bottom surface 32 of inner chassis 21 in stripes, while a double-faced tape is affixed to connection part 38. Front unit 40 is brought closer to inner chassis 21 with display 70 facing down, and display 70 may be inserted and pushed into the opening as it is.

Edge portion 54 of translucent panel 50 may be thereby guided to outer wall 33 of recess 31, so that curved portion 52 may enter recess 31. Bottom surface 32 of recess 31 and lower edge 53 of curved portion 52 may be brought closer to or abut on each other, and adhesive 82 on bottom surface 32 may be spread to bond lower edge 53 of curved portion 52 and bottom surface 32 of recess 31 as shown in FIGS. 6 to 8. Flat surface 51 of translucent panel 50 and connection part 38 may be affixed together with the double-faced tape.

When adhesive 82 is hardened, the attachment of front unit 40 to inner chassis 21 can be completed. Thereafter, mounting and electric connection of necessary electronic components 12 are conducted, and back chassis 24 may be fitted into inner chassis 21 to manufacture electronic device 10.

According to the present disclosure, recess 31 is located such that recess end 36 is deeper than middle portion 34 as described above. Even if warpage occurs at curved portion 52 of translucent panel 50 when forming curved portion 52 by bending or the like, such warpage can be absorbed by recess end 36 and can reduce the likelihood that translucent panel 50 will be attached with an inclination.

In recess 31, it is suitable to form bottom surface 32 of recess end 36 to be deeper than bottom surface 32 of middle portion 34 such that clearance α (see FIGS. 6 and 8) ranges from 0.1 mm to 0.4 mm.

In recess 31, bottom surface 32 of middle portion 34 has stepped portion 35 recessed toward the inner side as shown in FIG. 7. When applying adhesive 82 to the bottom surface of middle portion 34, excessive adhesive 82 does not remain at middle portion 34, but may flow to stepped portion 35. It is possible to reduce the likelihood that excessive adhesive 82 will overflow to the edge portion 54 side of translucent panel 50 to impair the appearance of electronic device 10. Adhesive 82 flown to stepped portion 35 may remain at stepped portion 35 to bond stepped portion 35 and lower edge 53 of curved portion 52.

Since recess end 36 has its inner sidewall 39 inclined as shown in FIGS. 6 and 8, the bottom area of recess end 36 can be made smaller than in the case of forming inner sidewall 39 of recess end 36 so as to be substantially orthogonal to flat surface 51 of translucent panel 50. As a result, it is possible to reduce the likelihood that adhesive 82 applied to recess end 36 will spread. Effective adhesion can be accomplished with a small amount of adhesive 82. This configuration particularly ensures the watertightness of translucent panel 50 and recess end 36.

Specifically, it is appropriate to form sidewall 39 in a curved shape projecting toward curved portion 52 of translucent panel 50, and as shown in FIGS. 6 and 8, it is more desirable to form sidewall 39 in a curved shape having a curvature substantially equal to the rear-side curvature of curved portion 52 of translucent panel 50. This can further improve the above-described effects. When a single crystal material, such as a sapphire panel, is used for translucent panel 50, cracking of translucent panel 50 can be suppressed in addition to the above-described effects. It is more appropriate to form sidewall 39 in a curved shape having a curvature substantially equal to the rear-side curvature of curved portion 52 of translucent panel 50. A single crystal material, such as a sapphire panel, may include a material that is less susceptible to deformation than a glass panel. When a single crystal material, such as a sapphire panel, is used for translucent panel 50, and when a load is applied to a portion where translucent panel 50 is not supported firmly from the rear side of the panel, the portion of translucent panel 50 to which the load has been applied is less susceptible to deformation, and translucent panel 50 may thus be broken at a load smaller than in the case where translucent panel 50 is made of glass. By supporting the rear surface of translucent panel 50 with sidewall 39 as described above, cracking can be suppressed. In that case, a smaller clearance between sidewall 39 and translucent panel 50 is preferable, and translucent panel 50 and sidewall 39 are preferably in contact with each other.

With the above-described configuration, the corner of curved portion 52 of translucent panel 50 which is susceptible to shock when electronic device 10 is dropped, for example, is pressed by sidewall 39 from the inner side, which brings an advantage that a stress that would be caused by such a shock can be eased.

Merely by bonding translucent panel 50 and flexible touch panel 60 by affixing adhesive sheet 80 serving as an adhesive joint only to flat surface 51 as shown in FIG. 7, touch panel 60 may be separated from curved portion 52. Particularly since touch panel 60 is bent by abutting on curved portion 52, adhesive sheet 80 in proximity to curved portion 52 may peel off due to the restoring force of touch panel 60.

Figure 9:
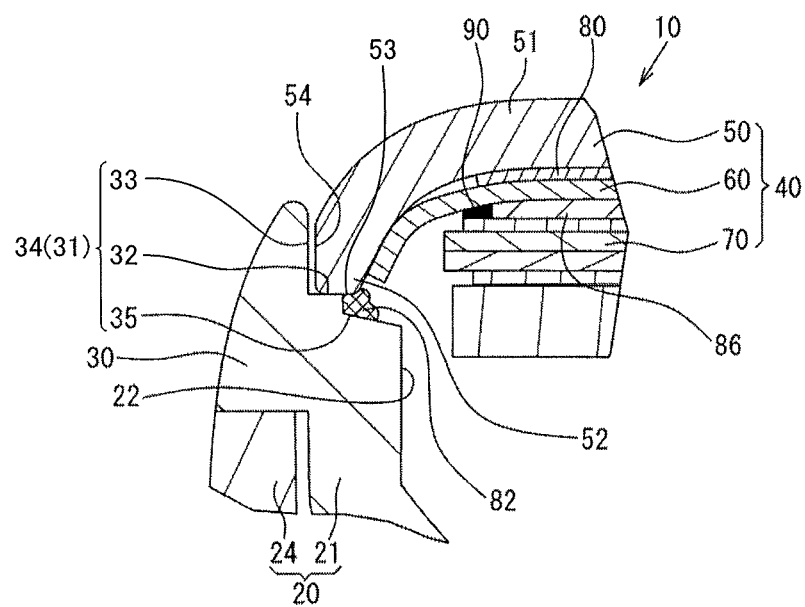
FIG. 9 is an enlarged cross sectional view of circled part B shown in FIG. 4.

In this case, as shown in FIG. 9, a rubber-like elastic member 90, such as a sponge or silicone rubber, may be inserted between the peripheral surface of touch panel 60 in proximity to curved portion 52 and flat surface 51 of translucent panel 50 to reduce the likelihood that touch panel 60 will be separated. With this configuration, touch panel 60 is pressed against flat surface 51 of translucent panel 50 to maintain the affixing force of adhesive sheet 80, which can reduce the likelihood that touch panel 60 will peel off.

Figure 10:
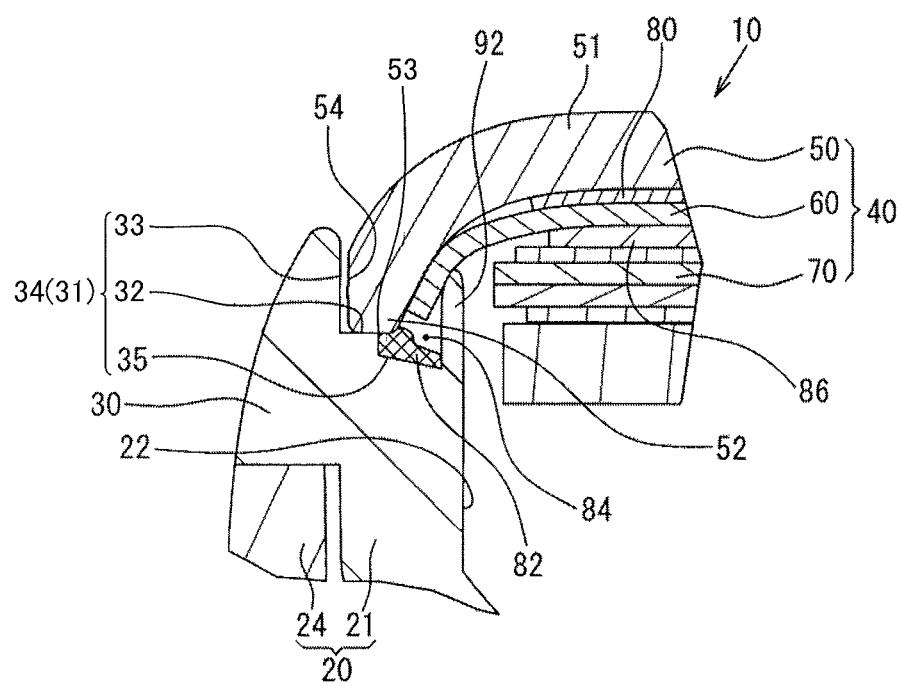
FIG. 10 is an enlarged cross sectional view of circled part B shown in FIG. 4.

As shown in FIG. 10, inner chassis 21 may also have a rib 92 arranged upright from bottom surface 32 or stepped portion 35 of middle portion 34 of recess 31 toward curved portion 52 to push up touch panel 60 of curved portion 52 from below with front unit 40 being attached. Rib 92 can be located on the periphery of opening 22. Curved portion 52 of touch panel 60 can thus be pressed by rib 92 and the likelihood of being separated can be reduced, thereby maintaining the affixing force of adhesive sheet 80. When a single crystal material, such as a sapphire panel, is used for translucent panel 50, it is more appropriate to form rib 92 since cracking of translucent panel 50 can be suppressed in addition to the above-described effects. A single crystal material, such as a sapphire panel, has a property less susceptible to deformation. When a single crystal material, such as a sapphire panel, is used for translucent panel 50, and when a load is applied to a portion where translucent panel 50 is not supported firmly, the portion of translucent panel 50 to which the load has been applied is less susceptible to deformation, and may be broken. By supporting the rear surface of translucent panel 50 with rib 92, cracking can be suppressed.

Rib 92 can also be located along the entire length of middle portion 34, or may be formed to project from one or several places of middle portion 34. At the bottom of middle portion 34, stepped portion 35 described above can also be located next to rib 92. If rib 92 is located along the entire length of middle portion 34, and when lower edge 53 of curved portion 52 of translucent panel 50 and bottom surface 32 of middle portion 34 are bonded as shown in FIG. 10, rib 92 can reduce the likelihood that excessive adhesive 82 will flow out, thereby forming an adhesive pool 84 on stepped portion 35. It is thus possible to reduce the likelihood that excessive adhesive 82 will flow to the inner side of inner chassis 21. Adhesive 82 held back with rib 92 bonds inner chassis 21 and lower edge 53 of curved portion 52 of translucent panel 50, and can increase the bond strength.

The above description is intended for illustrating the present disclosure, and should not be construed as limiting the disclosure recited in claims or as restricting the scope. Each feature in the present disclosure is not limited to the above-described embodiments, but various modifications can be made thereto within the technical scope recited in the claims.

For example, the order of assembling front unit 40 and its configuration, the order of assembling inner chassis 21 and its configuration, the configuration of electronic device 10, and the like are not limited to the above-described embodiment.

According to an electronic device of an embodiment of the present disclosure, by forming the attaching surface of the above-described configuration, a clearance can be left between an end of a curved portion where warpage is likely to occur and the attaching surface. It is possible to make it difficult for an end of an end surface of the curved portion to abut on the attaching surface, and a translucent panel can be attached to a casing stably.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An electronic device comprising:
   a translucent panel including a curved portion curved toward a specific direction and an edge surface facing toward the specific direction; and
   a casing including an attaching surface facing the edge surface, the translucent panel being attached to the casing,
   wherein a first distance between an end portion of the edge surface and a first portion of the attaching surface facing the end portion of the edge surface is longer than a second distance between a middle portion of the edge surface and a second portion of the attaching surface facing the middle portion, wherein the first distance is measured at a first cross-section of the translucent panel and casing located at a top or bottom portion of the electronic device and the second distance is measured at a second cross-section of the translucent panel and casing located at a middle portion of the electronic device between the top and bottom portions.

2. The electronic device according to claim 1, wherein a portion of the attaching surface facing the end portion of the edge surface of the translucent panel is recessed relative to a portion of the attaching surface facing the middle portion of the edge surface of the translucent panel.

3. The electronic device according to claim 1, further comprising an adhesive applied to the attaching surface, wherein the edge surface is bonded to the attaching surface.

4. The electronic device according to claim 1, wherein the attaching surface has a stepped portion in a portion facing the middle portion, the stepped portion being recessed toward an inner side of the casing.

5. The electronic device according to claim 1, wherein the curved portion is located between two ends opposed to each other of the translucent panel.

* * * * *